US012299268B2

(12) United States Patent
Chundi et al.

(10) Patent No.: US 12,299,268 B2
(45) Date of Patent: *May 13, 2025

(54) SYSTEMS AND METHODS FOR NAVIGATING CONTENT

(71) Applicant: Adeia Guides Inc., San Jose, CA (US)

(72) Inventors: Charishma Chundi, Andhra Pradesh (IN); Susanto Sen, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,647

(22) Filed: Feb. 24, 2022

(65) Prior Publication Data

US 2022/0291819 A1 Sep. 15, 2022

Related U.S. Application Data

(63) Continuation of application No. 16/904,215, filed on Jun. 17, 2020, now Pat. No. 11,287,964.

(51) Int. Cl.
*G06F 3/04847* (2022.01)
*G06F 3/04842* (2022.01)
(Continued)

(52) U.S. Cl.
CPC ...... *G06F 3/04847* (2013.01); *G06F 3/04842* (2013.01); *G06F 3/0488* (2013.01);
(Continued)

(58) Field of Classification Search
CPC .............. G06F 3/04847; G06F 3/0488; G06F 3/04842; G06F 3/04855; H04N 21/47217; G11B 27/005

See application file for complete search history.

(56) References Cited

U.S. PATENT DOCUMENTS 5,903,267 A * 5/1999 Fisher ................. G06F 3/04855
345/157
6,515,689 B1 * 2/2003 Terashima ............ G06F 3/0485
345/157
(Continued)

FOREIGN PATENT DOCUMENTS

EP 3125094 A1 2/2017
EP 3309670 A1 4/2018

OTHER PUBLICATIONS

Touch screen, Microsoft Computer Dictionary 524 (5th ed.) (Year: 2002).*

(Continued)

*Primary Examiner* — Justin R. Blaufeld
(74) *Attorney, Agent, or Firm* — Haley Guiliano LLP

(57) ABSTRACT

Methods and systems for navigating content are provided. A method includes detecting an input to perform a content navigation operation in a display interface, the input designating a two-dimensional path in a content display interface. The method determines a forward or reverse direction for the content navigation operation and receives an input indicating the two-dimensional path within the content display interface. The length of the path is determined and the content is navigated based upon the determined direction and length of the two-dimensional path. A system comprising input circuitry configured to detect an input to perform a content navigation operation on a content, and a control circuitry programmed and configured for implementing the method is also provided.

20 Claims, 7 Drawing Sheets

(51) Int. Cl.
*G06F 3/0488* (2022.01)
*H04N 21/422* (2011.01)
*H04N 21/472* (2011.01)
*G06F 3/04855* (2022.01)

(52) U.S. Cl.
CPC . *H04N 21/42224* (2013.01); *H04N 21/47217* (2013.01); *G06F 3/04855* (2013.01); *G06F 2203/04808* (2013.01)

(56) References Cited

U.S. PATENT DOCUMENTS

| | | | | |
|---|---|---|---|---|
| 9,372,604 | B2* | 6/2016 | Oetzel | G06F 11/076 |
| 10,423,308 | B2* | 9/2019 | Tischer | G11B 27/034 |
| 11,287,964 | B2* | 3/2022 | Chundi | H04N 21/42224 |
| 2004/0021676 | A1* | 2/2004 | Chen | G06F 3/0485 |
| | | | | 345/684 |
| 2008/0165141 | A1* | 7/2008 | Christie | G06F 3/0482 |
| | | | | 345/173 |
| 2009/0303188 | A1* | 12/2009 | Triplett | G06F 3/04883 |
| | | | | 345/173 |
| 2010/0194706 | A1* | 8/2010 | Watanabe | G06F 3/04847 |
| | | | | 345/173 |
| 2012/0272181 | A1* | 10/2012 | Rogers | G06F 3/0482 |
| | | | | 715/784 |
| 2012/0280922 | A1* | 11/2012 | Lee | G06F 3/0488 |
| | | | | 345/173 |
| 2013/0104074 | A1* | 4/2013 | Takahashi | G06F 3/0488 |
| | | | | 715/784 |
| 2013/0185638 | A1* | 7/2013 | Tischer | G06F 3/0484 |
| | | | | 715/719 |
| 2013/0227441 | A1* | 8/2013 | Cockcroft | G06F 3/04817 |
| | | | | 715/760 |
| 2013/0322848 | A1* | 12/2013 | Li | H04N 5/783 |
| | | | | 386/E5.003 |
| 2014/0029914 | A1 | 1/2014 | Deglise et al. | |
| 2014/0111422 | A1 | 4/2014 | Chow | |
| 2014/0123066 | A1* | 5/2014 | Wolters | G06F 3/0488 |
| | | | | 715/833 |
| 2014/0215413 | A1* | 7/2014 | Calkins | G06F 3/0483 |
| | | | | 715/863 |
| 2014/0258854 | A1* | 9/2014 | Li | H04N 21/414 |
| | | | | 715/702 |
| 2015/0135074 | A1* | 5/2015 | Oetzel | G06F 3/04883 |
| | | | | 715/716 |
| 2015/0309686 | A1* | 10/2015 | Morin | G06F 3/0488 |
| | | | | 715/720 |
| 2016/0018983 | A1* | 1/2016 | Bostick | G06F 3/0488 |
| | | | | 715/720 |
| 2016/0357353 | A1* | 12/2016 | Miura | G11B 27/34 |
| 2016/0370982 | A1* | 12/2016 | Penha | G11B 27/34 |
| 2017/0024121 | A1 | 1/2017 | Park et al. | |
| 2017/0068402 | A1* | 3/2017 | Lochhead | H04N 21/47217 |
| 2019/0034075 | A1* | 1/2019 | Smochko | G06F 3/04842 |
| 2019/0179526 | A1* | 6/2019 | Yellen | G11B 27/00 |
| 2019/0191208 | A1* | 6/2019 | Coenen | H04N 21/4312 |
| 2021/0397318 | A1 | 12/2021 | Chundi et al. | |

OTHER PUBLICATIONS

Wilbert O. Galitz, The Essential Guide to User Interface Design 389-390 and 473-477 (2nd Ed. 2002) (Year: 2002).*
PCT International Search Report and Written Opinion for International Application No. PCT/US2020/066662, dated Apr. 12, 2021.

* cited by examiner

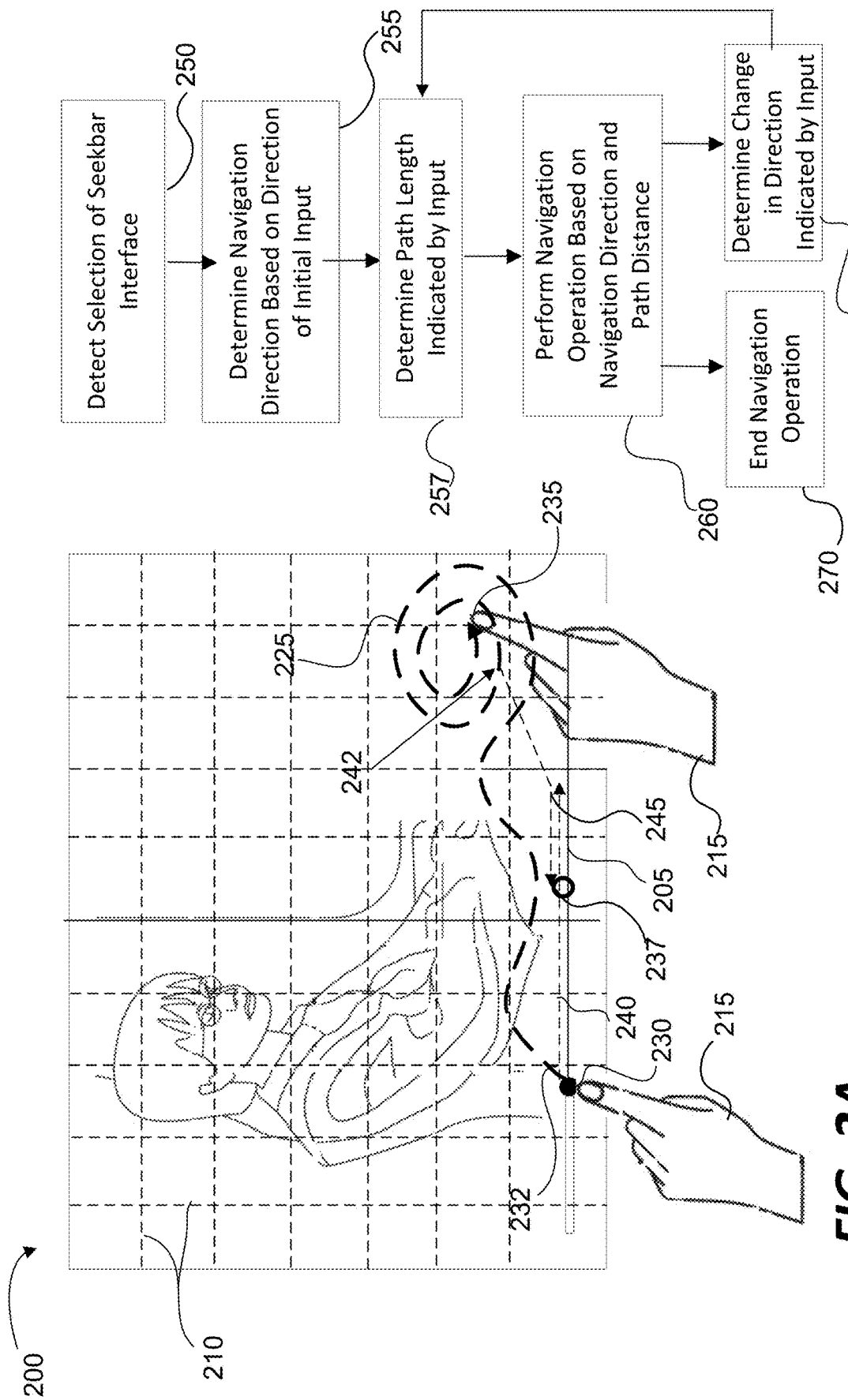

SYSTEMS AND METHODS FOR NAVIGATING CONTENT

CROSS-REFERENCE TO RELATED APPLICATIONS

This application is a continuation of U.S. patent application Ser. No. 16/904,215, filed Jun. 17, 2020, the disclosure of which is hereby incorporated by reference herein in its entirety.

BACKGROUND

The present disclosure relates to media play systems and methods and, more particularly, to systems and methods related to media play operations.

SUMMARY

Audio and video media devices, such as dedicated recorders, televisions, and more recently handheld devices (e.g., smartphone and tablets) offer their users the flexibility to perform various media content manipulation, offline (disconnected from the Internet access) or online (while connected to the Internet wirelessly or with wire). Benefiting from modern day technology advancements, media device users enjoy flexible media content (e.g., videos and audio books) consumption at and during a time of their choosing, at a location of their choosing, and with a media device of their choosing.

Media devices are ubiquitous, available on a variety of platforms and implemented on and compatible with a variety of networks and electronic devices. Continuously growing in application, it is no surprise that each media device type features a unique user experience. For example, a smart television or a digital recorder in combination with a large screen display, offers the consumer no less than a theater-like viewing experience yet a smart handheld device offers the consumer the convenience of mobility. Where an audio player may not have or need graphics features, a video player typically does. Where a large form factor media player, such as a desktop computer, may be void of touchscreen media content functionality, a small form factor media player, such as a smartphone, is nearly expected with a touchscreen feature.

Media content functionality, like a touchscreen seekbar for media content skip operations, are among fairly recent electronic entertainment device improvements offering the consumer flexibility and convenience to rapidly navigate media content with a simple touch of the finger. Accordingly, different media device types offer different user experience, flexibility, and convenience.

A conventional seekbar, for example, allows user to navigate through a video/audio in forward or backwards direction. The seekbar length is not proportional to the length of audio/video. Instead, the seekbar's length is same for all the video/audio content. It is relatively easy to use the seekbar for audio/video content with small duration when compared to the ones with long duration. This is even worse in small screen devices for content with long duration. A user typically has to be very careful, otherwise there may be excessive back and forth horizontal adjustment needed to navigate to the user's preferred time point in the content. Sometimes such excessive, repetitive adjustments can lead to ergonomics problems like pain in the wrist, etc. In other situations, a user may be holding a device in a single hand and may have difficulty using that hand to navigate to the desired horizontal location on the seekbar. Thus, there is a need for improved media navigation tools for navigating to a desired play position and that is adapted to smaller display devices.

In some approaches described herein, an input (e.g., using a touchscreen) is detected for activating a media content navigation operation (e.g., selecting a seekbar tool), after which further inputs are detected, initially for indicating a navigation direction (e.g., swiping in a forward or reverse direction), and additionally for establishing a two dimensional (2D) path within a display interface. The extent of navigation (e.g., shift to a new play position from a starting play position) is at least proportional to the length of the 2D path. In some embodiments, the direction of navigation remains the same once it is initially established and until the operation is completed (e.g., by releasing a finger from a touchscreen, clicking a button).

In some embodiments, the proportional relationship between the path length and the extent of navigation (e.g., rate of shift in play position relative to path length) is configurable and is not necessarily directly proportional to an equivalent distance along a seekbar or to a similar tool (e.g., a scroll bar). For example, the rate of change/shift in play position with respect to path distance may be substantially less than the rate of change for an equivalent distance such as along a seekbar, thus permitting significantly more uninterrupted and refined control in navigating a media content.

Media content manipulation mechanisms, techniques and systems are introduced to facilitate convenient, rapid and precise navigation of media content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2A is an illustrative diagram of a graphical interface for navigating content according to some embodiments of the disclosure;

FIG. 2B is an illustrative flowchart of a process for navigating content according to some embodiments of the disclosure;

DETAILED DESCRIPTION

In an aspect of the disclosure, systems and methods implement an interface for content navigation. The interface is configured to detect activation of a navigation process using the interface, detect an initial input for establishing a navigation direction, and detect an input establishing a two dimensional (2D) path in the interface according to some embodiments. The content is navigated based upon the established navigation direction and 2D path length.

Figure 1B:
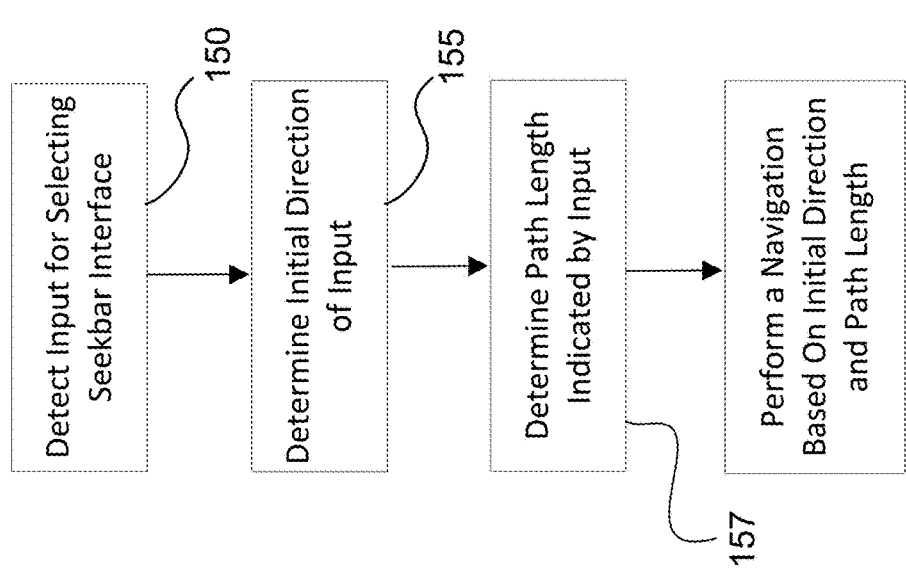
FIG. 1B is an illustrative flowchart of a process for navigating content according to some embodiments of the disclosure.
Figure 1A:
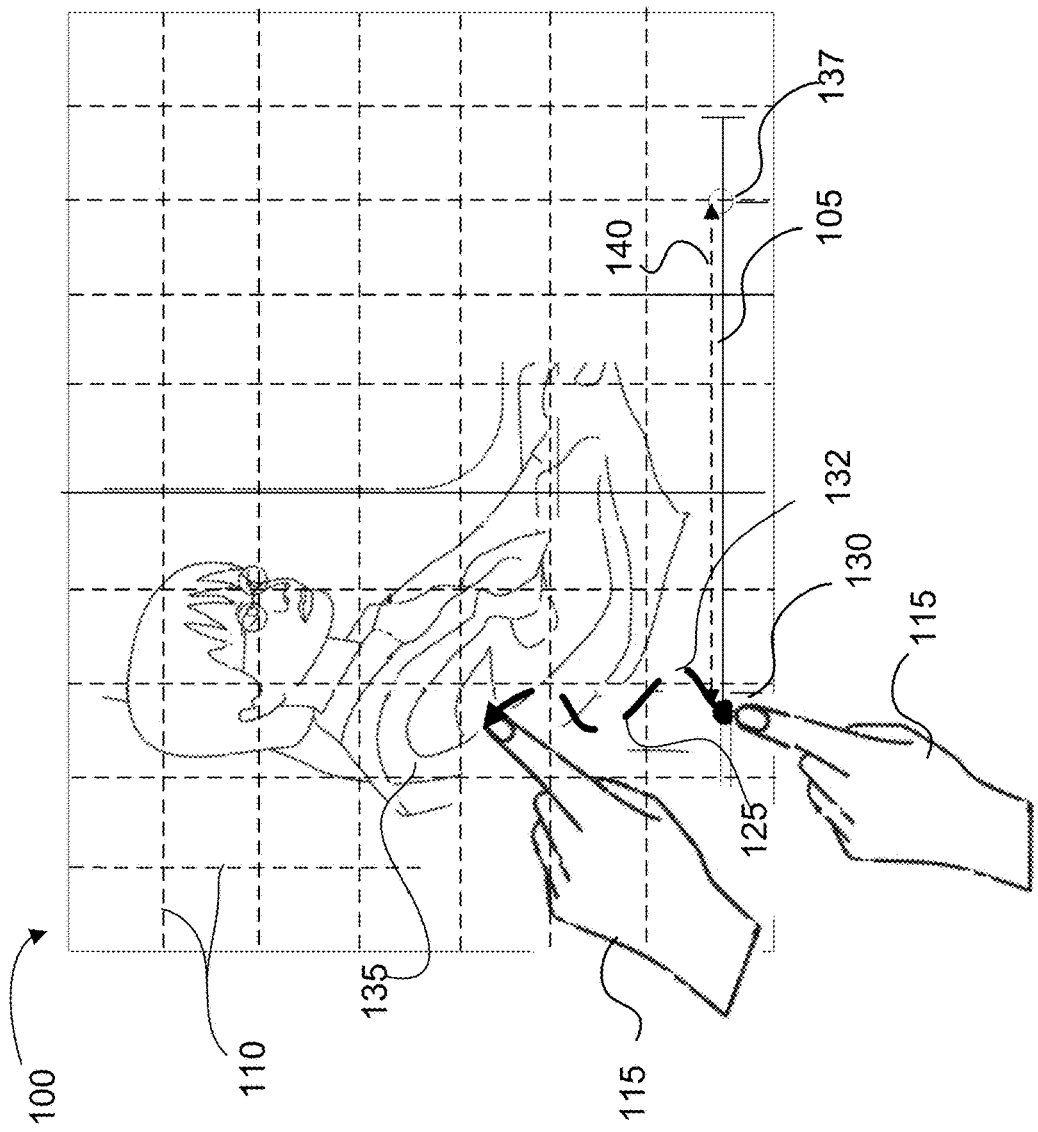
FIG. 1A is an illustrative diagram of a graphical interface for navigating content according to some embodiments of the disclosure.

FIG. 1A is an illustrative diagram of a graphical interface for navigating content according to some embodiments of the disclosure. A graphical interface 100 is displayed (e.g., in a touchscreen of a computerized mobile device) showing a frame of many frames of content (e.g., a movie). The interface 100 includes a seekbar 105 enabled for navigating the content such as by the sliding (e.g., in response to physical swiping) of a movable tab at 130 within the seekbar 105.

In response to moving the tab, the content may navigate in a forward or reverse direction to a particular play position within the content where the leftmost end of the seekbar represents a beginning play position and the rightmost position represents an end play position of the content. The relative position of the tab within the seek bar may represent the relative play position that the content is set to.

In some embodiments, a navigation process is activated by selecting seekbar 105 through the touch of a finger of hand 115 at a location 130. Selection and activation may also be performed utilizing other input interfaces (e.g., touchpad, mouse, keyboard). After selecting seekbar 105 and activating the navigation process, further input through interface 100 is initially monitored and detected as repositioning to a forward (e.g., rightward) direction at 132, as shown. In some embodiments, this initially detected navigation direction is used to determine the navigation direction (e.g., forward or reverse) until the completion of the active navigation process.

Based upon the detected input, including the movement of a finger of hand 115 establishing a 2D path 125, a path length of 2D path 125 is calculated. 2D path 125 and its length may be determined with respect to a 2D grid 110 of coordinates (e.g., based upon pixels of display interface 100 or the input resolution of the display screen). As the path 125 is established, a play position of content is forwarded (based on the initially detected direction) by an extent that is based upon the length of the path. In some embodiments, the content is not forwarded until the completion of the navigation operation (e.g., by releasing the finger of hand 115 from the display interface 100). In some embodiments, the advanced play position is represented by a preview window overlaying interface 100 and displays the content corresponding to the forwarded position while the content continues to play (or is paused) from its original position in a primary window. As path 125 is established, a tab at position 137 of seekbar 105 may also move a distance in accordance with the calculated path length.

An end of path 125 at position 135 may be established by detecting the lifting of finger 115 from the interface 100 at position 135 or by another detected input (e.g., a mouse click). After completion of path 125, the play position of the content is forwarded on the basis of the path length as described above. In some embodiments, after the path is established, a separate input is needed (e.g., a mouse/button click) to confirm and process the navigation operation. Tab 130 of seekbar 105 may further advance to position 137 at a distance 140 that is proportional to the distance of path 125.

FIG. 1B is an illustrative flowchart of a process for navigating content according to some embodiments of the disclosure. For example, the content navigation systems of FIGS. 3A and 3B may perform the process, implemented on any suitable hardware such as on user devices 370, 380, and/or server 350 in connection with FIGS. 3A and 3B, any other suitable device, or any combination thereof. In some embodiments, executable code causes implementation of the process utilizing the circuitry (e.g., input circuitry 316, processing circuitry 340 and/or 326, transceiver circuitry 362 and/or 360) on such devices and/or servers. In some embodiments, the executable code may cause the functionality shown in FIGS. 1A, 2A, and/or 5A.

At step 150, the selection of a content navigation interface (e.g., the pressing of seekbar 105) is used to activate a content navigation operation. At step 155, input through an interface is detected and used to determine the direction of the navigation operation (e.g., forward or reverse). In some embodiments, an initial swipe and the direction (e.g., rightward or leftward) of the swipe in a touch screen or similar interface is used to determine the direction of the navigation operation. Once determined, the navigation direction may be maintained throughout the navigation operation until it is completed (e.g., regardless of whether further swipes or other inputs are indicative of different path directions than the initial swipe).

At step 157, based upon inputs indicating and establishing a path (e.g., path 125), a path length is determined within a display interface (e.g., display 100). In some embodiments, the path length is based on the distance along the established path. The path may be established by detecting the pressure on an interface (e.g., using a touchscreen) along the path (e.g., path 125 by the finger of hand 115). In some embodiments, the path may be established by various types of input devices (e.g., a touchscreen, a mouse, a wearable virtual reality device, and/or other suitable input devices). At step 160, based upon the length of the established path (e.g., length of path 125) and upon the determined initial navigation direction, the content is navigated to a new play position such as further described herein.

In some embodiments, feedback is provided that indicates a new play position based on the path length while the path is established. For example, a small overlay window may show an image of the content corresponding to a current/intermediary location and distance along the established path (e.g., of path 125). In some embodiments, a main display window (e.g. display interface 100) responsively presents the advanced or reversed content play frame according to the current/intermediary location and distance along the established path. A tab (e.g., tab 137) of a seekbar may also advance or reverse in position based upon the current/intermediary location and distance along the established path.

FIG. 2A is an illustrative diagram of a graphical interface for navigating content according to some embodiments of the disclosure. A graphical interface 200 is displayed (e.g., in a touchscreen of a computerized mobile device) showing a frame of many frames of content (e.g., a movie). The interface 200 includes a seekbar 205 enabled for navigating the content such as by the sliding (e.g., in response to physical swiping) of a movable tab 230 within the seekbar 205.

In some embodiments, a navigation process is activated by selecting seekbar 205 through the touch of a hand 215 at tab 230. Selection and activation may also be performed utilizing other input interfaces (e.g., touchpad, mouse, keyboard). After selecting seekbar 205 and activating the navigation process, further input through interface 200 is initially monitored and detected as repositioning to a forward (e.g., rightward) direction at position 232. In some embodiments, this initially detected direction is used to determine the direction (e.g., forward or reverse) of navigation of the displayed content until the completion of active navigation process.

Based upon the detected input, including the movement of hand 215 establishing a 2D path 225, a path length of 2D path 225 is calculated. 2D path 225 and its length may be determined with respect to a 2D grid 210 of coordinates (e.g., based upon pixels of display interface 200). As the path 225 is established, the play position (or previewed play position) of content is forwarded (based on the initially determined navigation direction) by an extent that is based upon the length of the path. In some embodiments, the extent of navigation is based upon a scaling parameter that may be set prior to or during of the navigation process. For example, the scaling parameter may specify that a particular unit path length of path 225 translates to one half the distance along seekbar 205. Thus, a user may advance or reverse through content with more control than provided by a seekbar with a relatively short length, particularly using a small sized display device such as integrated in a smart phone or tablet (e.g., devices 370 and 380 of FIG. 3A).

In some embodiments, the navigation direction of the of a navigation operation may be changed from the initial direction while establishing the path. For example, a system may be configured to receive input establishing a rotating path (e.g., around location 242) and, based on the input and a determined direction of rotation (e.g., clockwise/counterclockwise), modify the direction of navigation accordingly (e.g., forward/reverse, respectively). In some embodiments, the system will modify the direction when an extent of a determined rotation exceeds a predetermined amount (e.g., three hundred and sixty degrees).

In response to the change in direction, the feedback provided by the display interface 200 may also respond accordingly. For example, the presented content in display interface 200 may correspond to the newly determined forward or reverse navigation direction and a path length from where the modification of direction was determined (e.g., beginning from position 242). Tab 237 on the seekbar 205 may also reverse direction at position 245 (corresponding to position 242 along path 225) and further move to a corresponding position along seekbar 205 to a new position 237 corresponding to a path distance between path positions 242 and 235.

An end of path 225 at position 235 may be established by detecting the lifting of hand 215 from the interface 200 at tab 230 or by another detected input (e.g., a mouse click). In some embodiments, after completion of path 225, the play position of the content is forwarded on the basis of the path length as described above. Tab 230 of seekbar 105 may further advance to position 137 at a distance 140 that is based upon (e.g., proportional to) the distance of path 125.

FIG. 2B is an illustrative flowchart of a process for navigating content according to some embodiments of the disclosure. For example, the content navigation systems of FIGS. 3A and 3B may perform the process, implemented on any suitable hardware such as on user devices 370, 380, and/or server 350 in connection with FIGS. 3A and 3B, any other suitable device, or any combination thereof. In some embodiments, executable code causes implementation of the process utilizing the circuitry (e.g., input circuitry 316, processing circuitry 340 and/or 326, transceiver circuitry 362 and/or 360) on such devices and/or servers. In some embodiments, the executable code may cause the functionality shown in FIGS. 1A, 2A, and/or 5A. At step 250, the selection of a content navigation interface (e.g., the pressing of seekbar 205) is used to activate a content navigation operation. At step 255, input through an interface is detected and used to determine the direction of the navigation operation (e.g., forward or reverse). In some embodiments, an initial swipe and the direction (e.g., rightward or leftward) of the swipe in a touch screen or similar interface is used to determine the initial direction of the navigation operation.

At step 257, based upon inputs indicating and establishing a path (e.g., path 125), a path length is determined within a display interface (e.g., display 100). In some embodiments, the path length is based on the distance along the established path. The path may be established by detecting the pressure on an interface (e.g., using a touchscreen) along the path (e.g., path 125 by the finger of hand 115). In some embodiments, the path may be established using various types of input devices (e.g., a touchscreen, a mouse, a wearable virtual reality device, and/or other suitable input devices).

At step 260, based upon the length of the established path (e.g., length of path 225) and upon the determined navigation direction, the content is navigated to a new play position. The rate of change in navigation advancement relative to the path length may be substantially less (or more) than the rate for an equivalent distance along a seekbar (e.g., length 240 along seekbar 205). Thus, a user may be permitted to utilize a relatively uninterrupted and smooth movement about a display to perform a precise navigation of content. Such an implementation may be particularly useful when implemented with devices having relatively smaller display interfaces (e.g., a smartphone or tablet).

In some embodiments, such as exemplified in FIG. 2A, the direction of navigation may be modified from the initial navigation direction based on receiving particular input during the establishment of a path. At step 265, a change in navigation direction is determined based on a received input. In some embodiments, the received input may reflect a path rotating in a particular direction (e.g., clockwise, counterclockwise) that exceeds at least a minimum range of rotation (e.g., 360 degrees). Thus, an operator may reverse the direction of navigation without needing to start a new navigation operation (e.g., by re-selecting seekbar 205). After the change in navigation direction, a system may further receive input indicating a path at step 257.

At step 270, the navigation operation may be ended such as based upon receiving input indicating the termination of the path. For example, lifting of the finger of hand 215, a mouse click, or other suitable input, may be used to end the navigation operation.

Figure 3A:
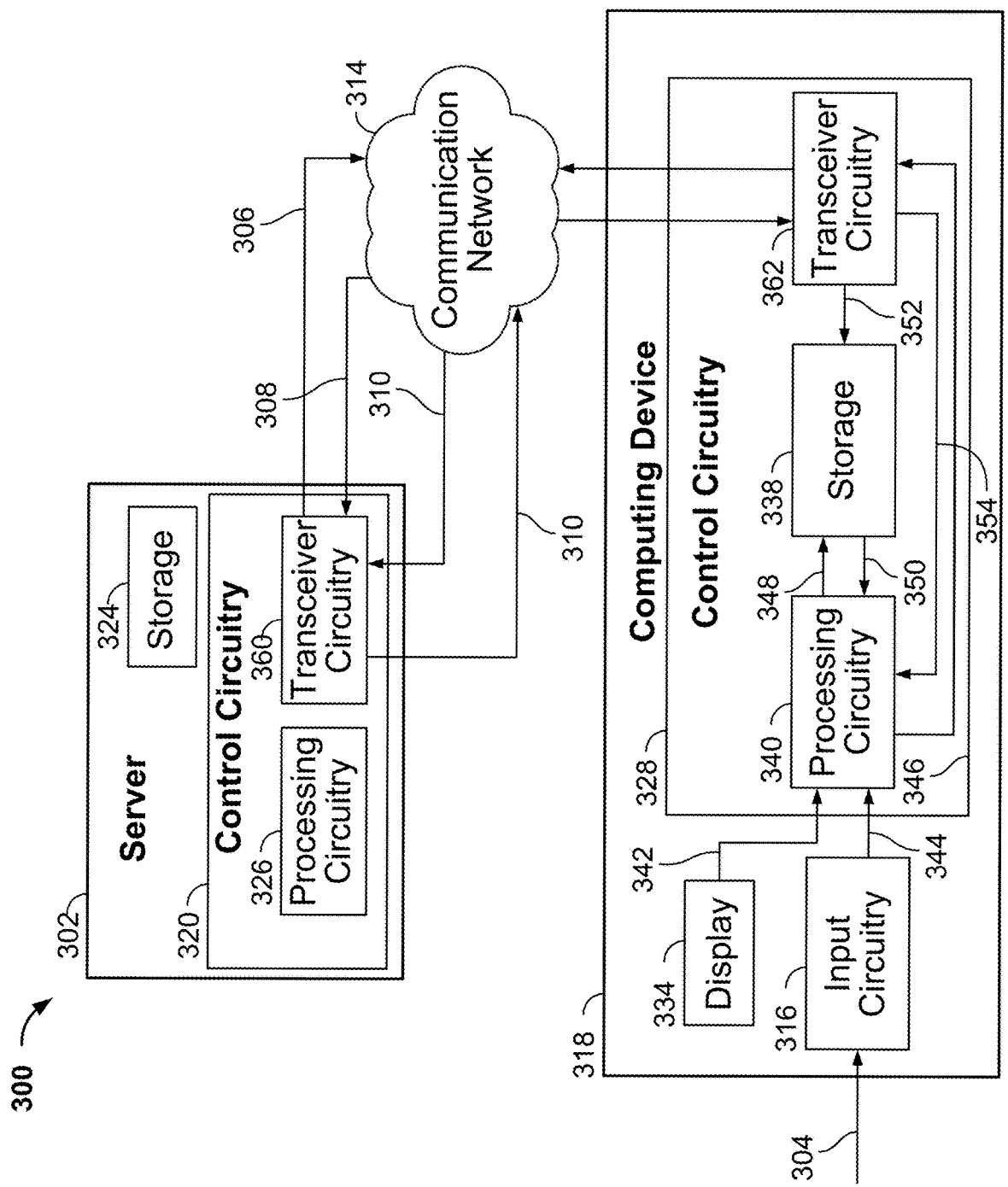
FIG. 3A is an illustrative topology of devices programmed and configured for navigating content according to some embodiments of the disclosure.

FIG. 3A is an illustrative block diagram showing a content navigation operation system incorporating content navigation operation features, in accordance with some embodiments of the disclosure. In FIG. 3A, a content navigation operation system is configured as content navigation operation system 300 in accordance with some embodiments of the disclosure. In an embodiment, one or more parts of or the entirety of system 300 may be configured as a system implementing various features, processes, and components of FIGS. 1-2 and 4-6. Although FIG. 3A shows a certain number of components, in various examples, system 300 may include fewer than the illustrated number of components and/or multiples of one or more of the illustrated number of components.

System 300 is shown to include a computing device 318, a server 302 and a communication network 314. It is understood that while a single instance of a component may be shown and described relative to FIG. 3A, additional instances of the component may be employed. For example, server 302 may include, or may be incorporated in, more than one server. Similarly, communication network 314 may include, or may be incorporated in, more than one communication network. Server 302 is shown communicatively coupled to computing device 318 through communication network 314. While not shown in FIG. 3A, server 302 may be directly communicatively coupled to computing device 318, for example, in a system absent or bypassing communication network 314.

Communication network 314 may comprise one or more network systems, such as, without limitation, an Internet, LAN, WIFI or other network systems suitable for audio processing applications. In some embodiments, system 300 excludes server 302 and functionality that would otherwise be implemented by server 302 is instead implemented by other components of system 300, such as one or more components of communication network 314. In still other embodiments, server 302 works in conjunction with one or more components of communication network 314 to implement certain functionality described herein in a distributed or cooperative manner. Similarly, in some embodiments, system 300 excludes computing device 318 and functionality that would otherwise be implemented by computing device 318 is instead implemented by other components of system 300, such as one or more components of communication network 314 or server 302 or a combination. In still other embodiments, computing device 318 works in conjunction with one or more components of communication network 314 or server 302 to implement certain functionality described herein in a distributed or cooperative manner.

Computing device 318 includes control circuitry 328, display 334 and input circuit 316. Control circuitry 328 in turn includes transceiver circuitry 362, storage 338 and processing circuitry 340. In some embodiments, media devices 370 or 380 of FIG. 3B may be configured in accordance with computing device 318 and control circuitry 328.

Server 302 includes control circuitry 320 and storage 324. Each of storages 324, and 338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 324, 338 may be used to store various types of content, metadata, and or other types of data. Non-volatile memory may also be used (e.g., to launch a boot-up routine and other instructions). Cloud-based storage may be used to supplement storages 324, 338 or instead of storages 324, 338. In some embodiments, control circuitry 320 and/or 328 executes instructions for an application stored in memory (e.g., storage 324 and/or storage 338). Specifically, control circuitry 320 and/or 328 may be instructed by the application to perform the functions discussed herein. In some implementations, any action performed by control circuitry 320 and/or 328 may be based on instructions received from the application. For example, the application may be implemented as software or a set of executable instructions that may be stored in storage 324 and/or 338 and executed by control circuitry 320 and/or 328. In some embodiments, the application may be a client/server application where only a client application resides on computing device 318, and a server application resides on server 302.

The application may be implemented using any suitable architecture. For example, it may be a stand-alone application wholly implemented on computing device 318. In such an approach, instructions for the application are stored locally (e.g., in storage 338), and data for use by the application is downloaded on a periodic basis (e.g., from an out-of-band feed, from an Internet resource, or using another suitable approach). Control circuitry 328 may retrieve instructions for the application from storage 338 and process the instructions to perform the functionality described herein. Based on the processed instructions, control circuitry 328 may determine a type of action to perform in response to input received from input circuit 316 or from communication network 314. For example, in response to a user swipe action and/or swipe direction, control circuitry 328 may perform the steps of processes relative to various embodiments, such as the example of FIGS. 1-2 and 4-6.

In client/server-based embodiments, control circuitry 328 may include communication circuitry suitable for communicating with an application server (e.g., server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 314). In another example of a client/server-based application, control circuitry 328 runs a web browser that interprets web pages provided by a remote server (e.g., server 302). For example, the remote server may store the instructions for the application in a storage device. The remote server may process the stored instructions using circuitry (e.g., control circuitry 328) and/or generate displays. Computing device 318 may receive the displays generated by the remote server and may display the content of the displays locally via display 334. This way, the processing of the instructions is performed remotely (e.g., by server 302) while the resulting displays, such as the display windows described elsewhere herein, are provided locally on computing device 318. Computing device 318 may receive inputs from the user via input circuit 316 and transmit those inputs to the remote server for processing and generating the corresponding displays. Alternatively, computing device 318 may receive inputs from the user via input circuit 316 and process and display the received inputs locally, by control circuitry 328 and display 334, respectively.

Server 302 and computing device 318 may transmit and receive content and data such as media content via communication network 314. For example, server 302 may be a media content provider and computing device 318 may be a smart television configured to download or stream media content, such as a Harry Potter movie, from server 302. Control circuitry 320, 328 may send and receive commands, requests, and other suitable data through communication network 314 using transceiver circuits 360, 362, respectively. Control circuitry 320, 328 may communicate directly with each other using transceiver circuits 360, 362, respectively, avoiding communication network 314.

It is understood that computing device 318 is not limited to the embodiments and methods shown and described herein. In nonlimiting examples, computing device 318 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably operating a media content.

Control circuitry 320 and/or 318 may be based on any suitable processing circuitry such as processing circuitry 326 and/or 340, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 320 and/or control circuitry 318 are configured to implement a media content operation system, such as systems, or parts thereof, that perform various media content manipulation processes described and shown in connection with FIGS. 1-2 and 4-6 and/or systems carrying out the features described and shown relative to FIGS. 1-2 and 4-6.

Computing device 318 receives a user input 304 at input circuitry 316. For example, computing device 318 may receive a user input like a user swipe or user touch, as previously discussed. In some embodiments, computing device 318 is a media device (or player) configured as media devices 370 and 380, with the capability to access content. It is understood that computing device 318 is not limited to the embodiments and methods shown and described herein. In nonlimiting examples, computing device 318 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 304 may be received from a user gesture capturing interface that is separate from device 318, such as a remote control device, trackpad or any other suitable user movement sensitive or capture devices, or as part of device 318, such a touchscreen of display 334. Transmission of user input 304 to computing device 318 may be accomplished using a wired connection, such as an audio cable, USB cable, ethernet cable or the like attached to a corresponding input port at local device 300, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 304 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 340 may receive input 304 from input circuit 316. Processing circuitry 340 may convert or translate the received user input 304 that may be in the form of gestures or movement to digital signals. In some embodiments, input circuit 316 performs the translation to digital signals. In some embodiments, processing circuitry 340 (or processing circuitry 326, as the case may be) carry out disclosed processes and methods. For example, processing circuitry 340 or processing circuitry 326 may perform processes of FIGS. 1-2 and 4-6, respectively.

Figure 3B:
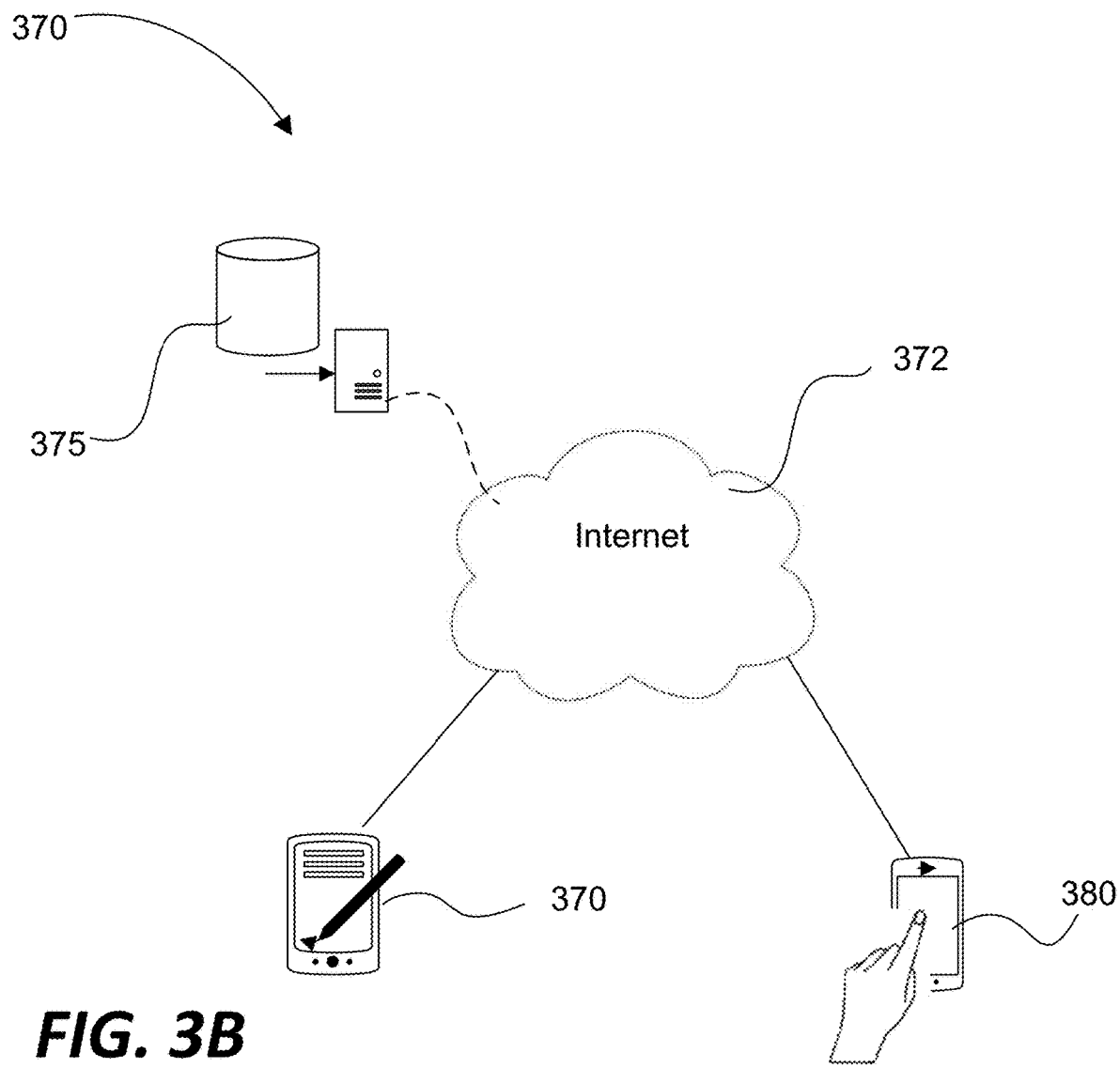
FIG. 3B shows an illustrative block diagram of a device in a content navigation system according to some embodiments of the disclosure.

FIG. 3B is an illustrative topology of a system 370 of devices programmed and configured for navigating content according to some embodiments of the disclosure. Devices 370 and 380 may be configured for presenting content (e.g., streaming video) and are connected via an internet 372 to a content server 375 that distributes content from a content store. Devices 370 and 380 may be programmed and configured in accordance with device 318 with display interfaces for navigating content and content server 350 may be configured in accordance with server 302, the devices and/or servers including programming for implementing the path-based navigation techniques described herein (e.g., from FIGS. 1-2 and 4-6).

Figure 4:
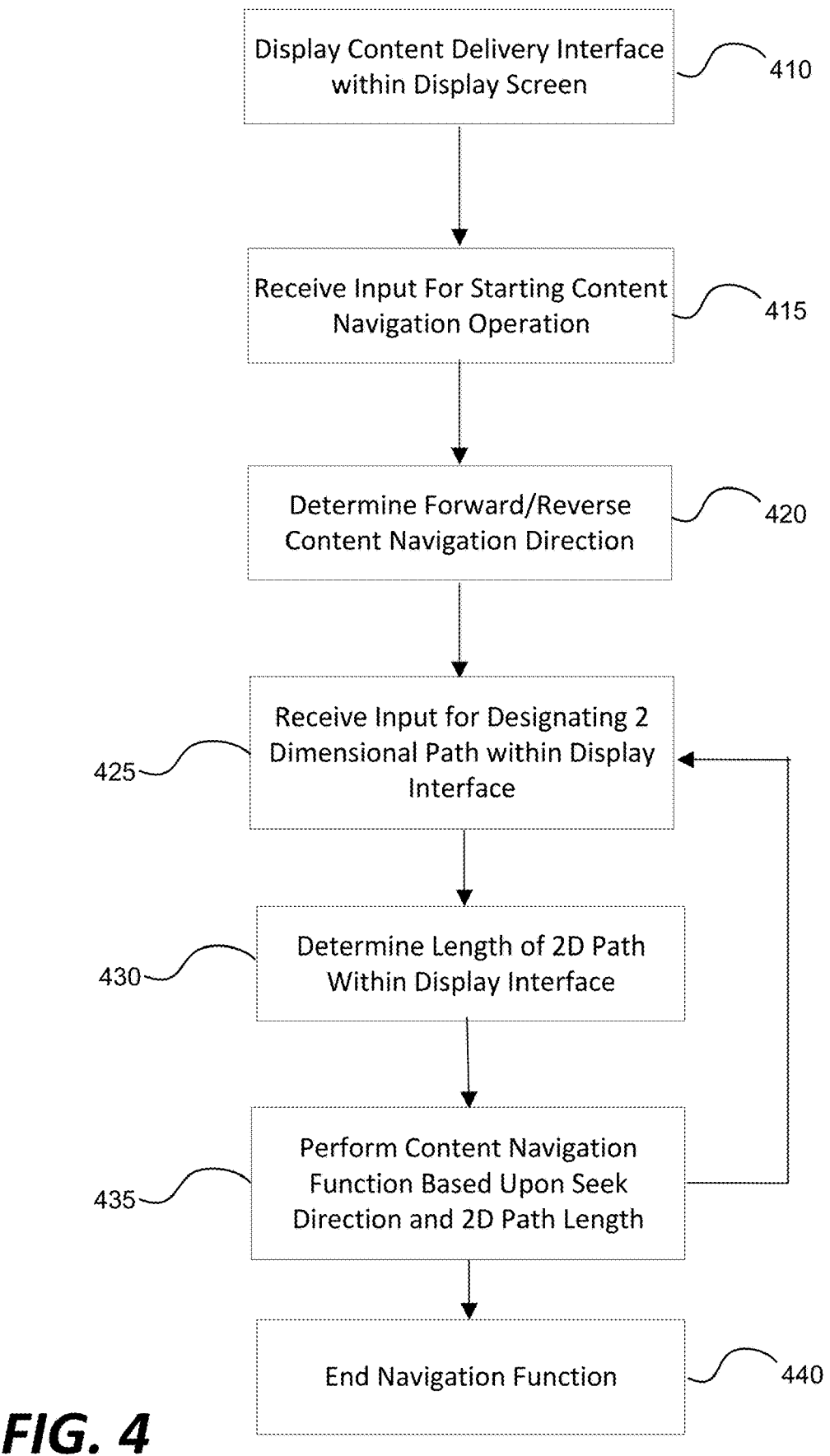
FIG. 4 is an illustrative flowchart of a process for navigating content according to some embodiments of the disclosure.

FIG. 4 is an illustrative flowchart of a process for navigating content according to some embodiments of the disclosure. For example, the content navigation systems of FIGS. 3A and 3B may perform the process, implemented on any suitable hardware such as on user devices 370, 380, and/or server 350 in connection with FIGS. 3A and 3B, any other suitable device, or any combination thereof. In some embodiments, executable code causes implementation of the process utilizing the circuitry (e.g., input circuitry 316, processing circuitry 340 and/or 326, transceiver circuitry 362 and/or 360) on such devices and/or servers. In some embodiments, the executable code may cause the functionality shown in FIGS. 1A, 2A, and/or 5A. At step 410, a content delivery interface (e.g., as shown in FIGS. 1A and 2A) is generated and displayed within a device display screen. The interface may include tools for navigating content (e.g., a seekbar, reverse button, forward button). At step 415, an input (e.g., user input) for activating a navigation of the content is received. In some embodiments, the input may be a touchscreen selection of a seekbar or other navigation tool.

At step 420, a direction of navigation is determined. As described in some embodiments herein, determining the direction of navigation may include monitoring/analyzing initial inputs following the activation of navigation. The determination may be based upon a direction of movement correlated with the initial inputs (e.g., a rightward/forward, leftward/reverse swipe of a touchscreen, forward/reverse buttons). In some embodiments, the determination may be based upon configuration settings including a time interval and/or degree of movement used for monitoring/analyzing initial inputs. In some embodiments, the determination may be made independently from initial inputs (e.g., a separate interface tool or menu setting for specifying navigation direction (e.g., control 560 of FIG. 5A).

At step 425, inputs are received that designate a 2D path within the display screen. The path may be designated by inputs from a touchscreen, for example, or other input mechanisms (e.g., a mouse). At step 430, the length of the 2D path designated by the inputs is determined. In some embodiments, the path length is determined in units of pixels. In some embodiments, the path length is determined in units of the input device (e.g., the resolution of a touch screen). In some embodiments, the path length is determined by dividing the path into a series of segments (e.g., curves) between points on the path, and estimating the distance of each segment such as by using calculus (e.g., parametric equations). In some embodiments, a path of a higher degree (e.g., a 3D path in a virtual reality environment) and its path length may be utilized accordingly.

At step 435, the content is navigated to a new play position based upon the path length and determined navigation direction. The difference between an original play position and the new position is based upon a translation of the determined path length to an amount of shift (e.g., in units of play time at a regular play speed). In some embodiments, the translation is based upon configurable parameters (e.g., units of time per measure of path distance) and/or proportional to an equivalent path length within a seekbar.

In some embodiments, as the path is being further designated by further received inputs at step 425, the path length is continually determined/updated at step 430 and the navigation of the content is correspondingly updated at step 435. At step 440, the navigation process may be terminated such as in response to a particular input (e.g., release of a touchscreen or click of a mouse). In some embodiments, the content may begin to play at normal speed upon termination of the navigation process. In some embodiments, during pauses in receiving inputs designating a path length, the content may begin to play at a normal speed from a new play position based upon the current path length. For example, the finger of hand 115 of FIG. 1A may stop moving and remain stationary at a position within display interface 100 for at least a predetermined period (pause) of time. The content may play from a position based upon the current determined path length. A resumption of the establishment of a path (e.g., by continuing to move the finger of hand 115 within interface 100) may further resume a navigation operation of the content pursuant to the established path and its length in accordance with various embodiments herein.

Figure 5A:
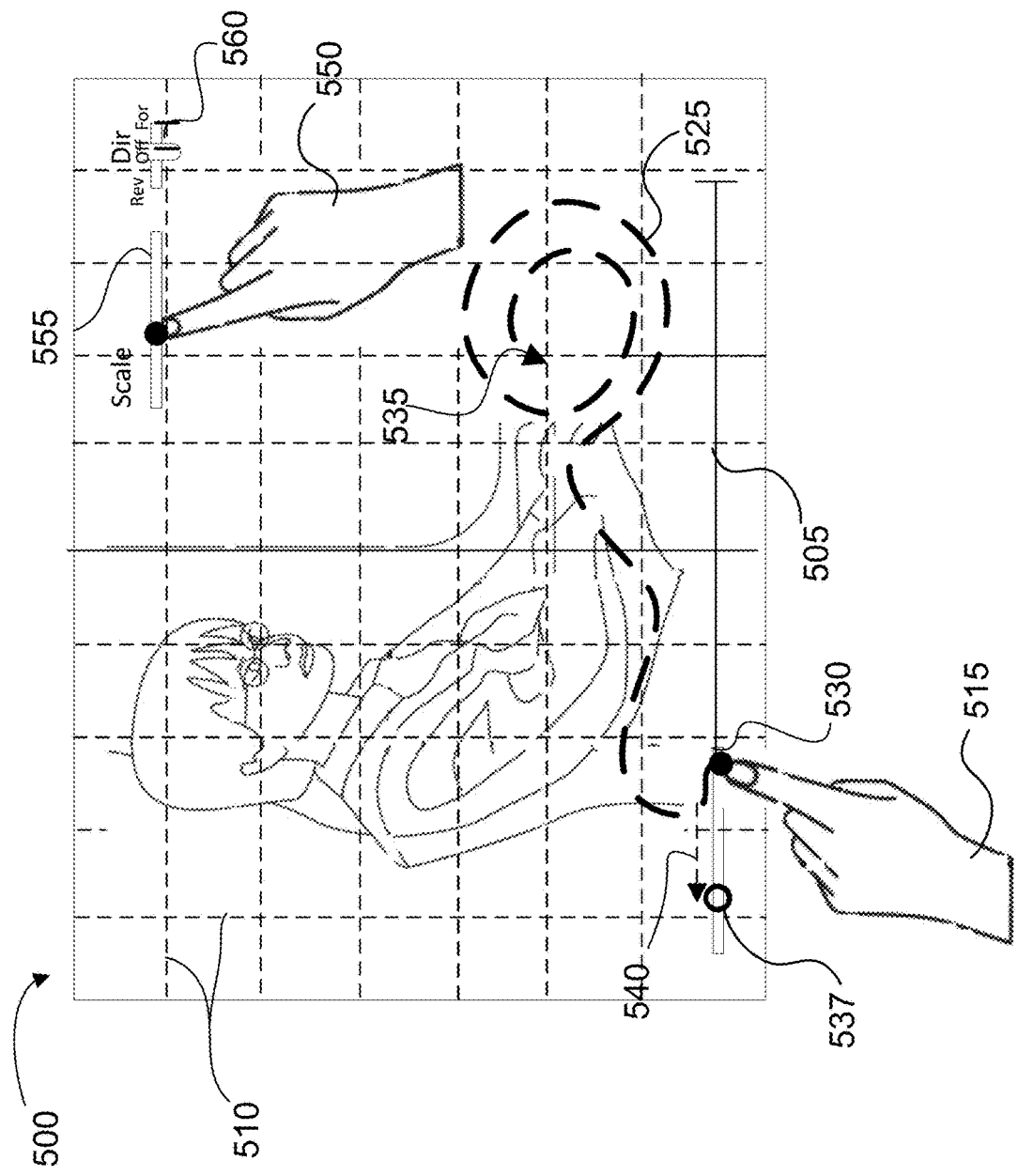
FIG. 5A is an illustrative diagram of a graphical interface for navigating content according to some embodiments of the disclosure.

FIG. 5A is an illustrative diagram of a graphical interface for navigating content according to some embodiments of the disclosure. A graphical interface 500 is displayed (e.g., in a touchscreen of a computerized mobile device such as of devices 370 and 380 of FIG. 3A) showing a frame of many frames of content (e.g., a movie). The interface 500 includes a seekbar 505 enabled for navigating the content such as by the sliding (e.g., in response to physical swiping) of a movable tab 530 within the seekbar 505.

In some embodiments, a navigation process is activated by selecting seekbar 505 through the touch of a hand 515 at tab 530. Selection and activation may also be performed utilizing other input interfaces (e.g., touchpad, mouse, keyboard). A separate toggle control 560 may be set to indicate the direction of navigation or set to use initial movement such as described herein. A slider control 555 is used to set a navigation scale through the touchscreen interface 500 by hand 550. The navigation scale setting is used to translate the length of a 2D path (e.g., path 525) to a shift in play position of the content. For example, a lower (leftward) setting of slider control 555 translates a unit of 2D path length to a smaller shift in play position and vice versa.

Based upon a detected input, including the movement of hand 515 establishing a 2D path 525, a path length of 2D path 525 is calculated. 2D path 525 and its length may be determined with respect to a 2D grid 510 of coordinates (e.g., based upon pixels of display interface 500). As the path 525 is established, the play position of content is reversed (based upon the setting of toggle 560) by an extent that is based upon the length of the path and the translation parameter of slider control 555. If the toggle is set to an "Off" position as shown, and does not designate a particular navigation direction, the direction of navigation may be based upon a determined initial input such as described in reference to FIGS. 1A and 2A. In some embodiments, if the toggle position is set to "For" (i.e., forward) or "Rev," (i.e., reverse) the navigation direction is based on the corresponding set direction of navigation.

An end of path 525 at position 535 may be established by detecting the lifting of the finger of hand 515 from the interface 500 at tab 530 or by another detected input (e.g., a mouse click). During and/or after completion of path 525, the play position of the content is reversed on the basis of the path length as described above. In response to establishing path 525, tab 530 of seekbar 505 may reverse to position 537 at a distance 540 that is based upon (e.g., proportional to) the distance of path 525. Other feedback techniques in response to establishing a path (e.g., a preview window) may also be employed such as further described herein.

Figure 5B:
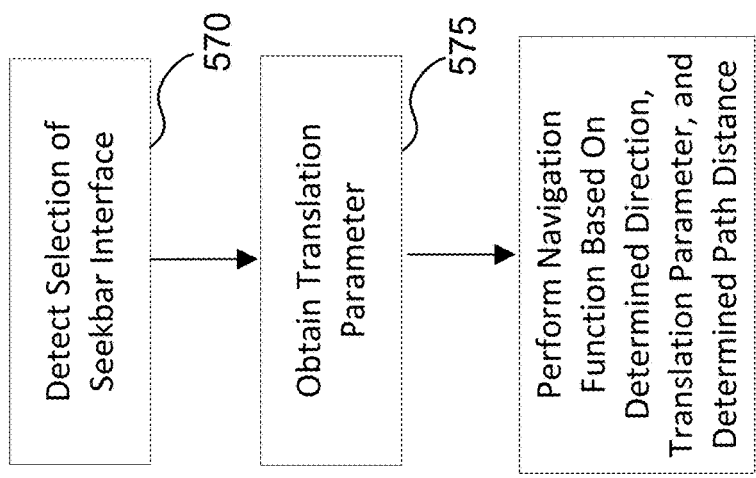
FIG. 5B is an illustrative flowchart of a process for navigating content according to some embodiments of the disclosure.

FIG. 5B is an illustrative flowchart of a process for navigating content according to some embodiments of the disclosure. At step 570, the selection of a content navigation interface (e.g., the selection of seekbar 505) is used to activate a content navigation operation. At step 575, a scaling parameter is obtained from a configuration setting (e.g., from control 555) for translating the length of a 2D path (e.g., path 525) to a shift in play position of the content.

At step 580, based upon a length of the established path (e.g., length of path 225), the determined navigation direction, and the translation parameter, the content is navigated to a new play position. By providing control over the translation parameter, fine or coarse control over navigating the content permit relatively uninterrupted and smooth movement within a display to perform a precise navigation of content.

Figure 6:
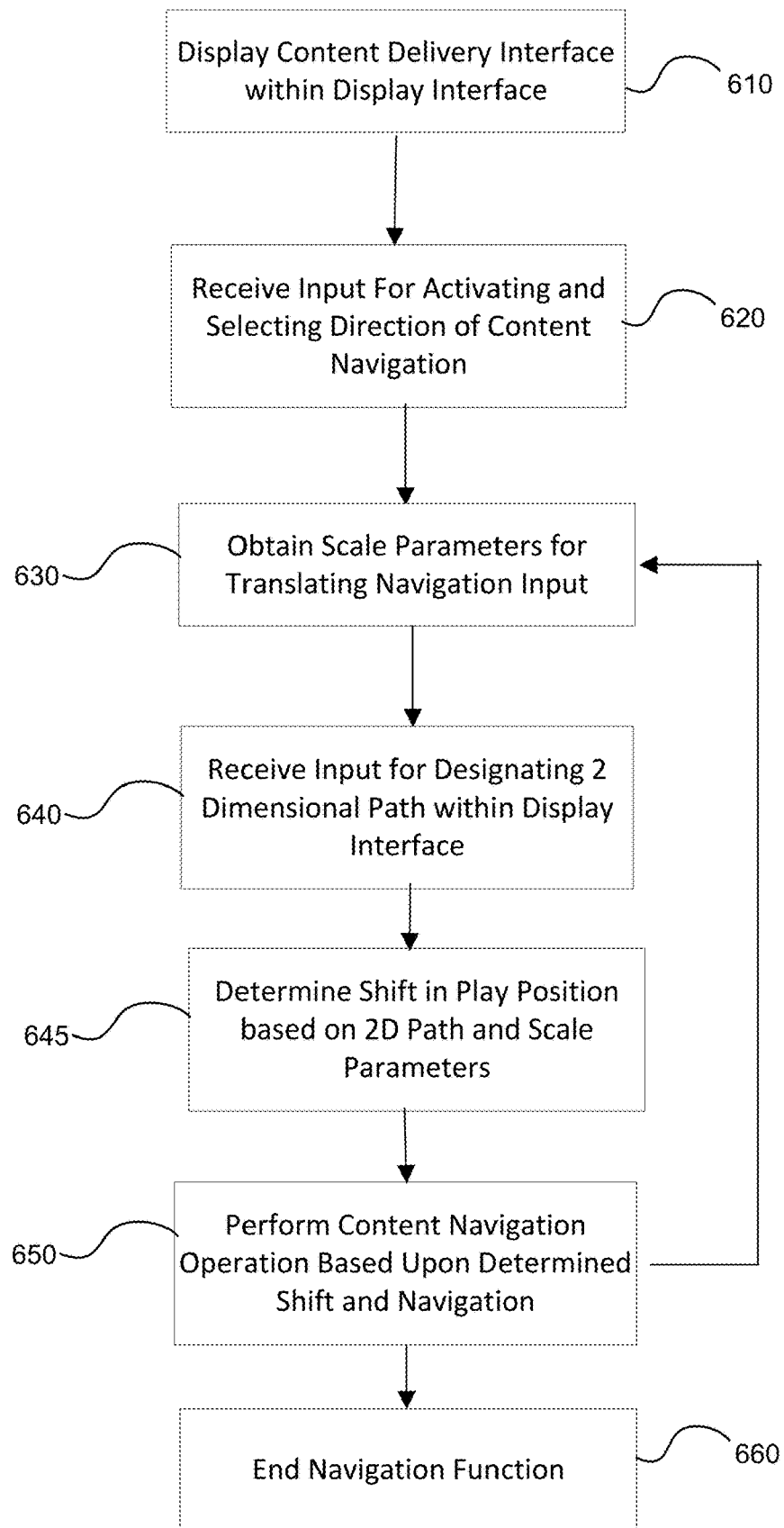
FIG. 6 is an illustrative flowchart of a process for navigating content according to some embodiments of the disclosure.

FIG. 6 is an illustrative flowchart of a process for navigating content according to some embodiments of the disclosure. For example, the content navigation systems of FIGS. 3A and 3B may perform the process, implemented on any suitable hardware such as on user devices 370, 380, and/or server 350 in connection with FIGS. 3A and 3B, any other suitable device, or any combination thereof. In some embodiments, executable code causes implementation of the process utilizing the circuitry (e.g., input circuitry 316, processing circuitry 340 and/or 326, transceiver circuitry 362 and/or 360) on such devices and/or servers. In some embodiments, the executable code may cause the functionality shown in FIGS. 1A, 2A, and/or 5A. At step 610, a content delivery interface (e.g., as shown in FIG. 5A) is generated and displayed within a device display screen. The interface may include tools for navigating content (e.g., a seekbar, reverse button, forward button). At step 620, an input (e.g., user input) for activating a navigation of the content is received. In some embodiments, the input may be a touchscreen selection of a seekbar or other navigation tool.

At step 630, parameters are obtained for translating the degree of navigation (e.g., shift in play position) relative to a path distance within the interface. For example, the parameters may be obtained from an interface control (e.g., control 555 of FIG. 5A), menu setting, and/or the speed of establishing a path (e.g., path 525). As another example, the parameters may be obtained from memory (e.g., storage 338).

At step 640, inputs are received that designate a 2D path within the display screen. The path may be designated by inputs from a touchscreen, for example, or other input mechanisms (e.g., a mouse). At step 645, a shift in play position is determined and based on the length of the 2D path and scale parameters obtained at block 630. In some embodiments, the shift in play position is calculated by multiplying the length of the 2D path by a scale parameter (e.g., units of shift per pixel of path length) obtained at block 630. At step 650, the content is navigated to a new play position based upon the determined shift in play position and navigation direction.

In some embodiments, as the path is being further designated by further received inputs at step 640, the path length is continually determined/translated at step 645 and the navigation of the content is correspondingly updated at step 650 and/or previewed utilizing feedback such as further described herein. At step 660, the navigation process may be terminated such as in response to a particular input (e.g., release of a touchscreen or click of a mouse). In some embodiments, the content may begin to play at normal speed upon termination of the navigation process. In some embodiments, during pauses in receiving inputs designating a path length, the content may begin to play at a normal speed from a new play position based upon the current path length.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
receiving, at an end user device comprising a touchscreen display, a first input that causes activation of a navigation process during playback of a content item, wherein the navigation process enables modification of a currently presented frame of a plurality of frames of the content item to a target frame of the plurality of frames;
accessing a predetermined resolution of the touchscreen display, wherein the predetermined resolution defines a number of pixels along at least one of a horizontal axis of the touchscreen display or a vertical axis of the touchscreen display;
generating, on the touchscreen display, a slider control for setting a scale of content navigation based at least in part on the predetermined resolution of the touchscreen display in response to receiving the first input, wherein modification of the slider control based on a second input correlates a number of pixels along at least one of the horizontal axis or the vertical axis of the touchscreen display to a number of frames of the plurality of frames;
receiving, at the touchscreen display, the second input that causes modification of the slider control to an updated setting along a scale of the slider control that is different from an original setting along the scale, wherein the updated setting modifies a correlated relationship between the number of pixels along at least one of the horizontal axis or the vertical axis of the touchscreen display to the number of frames of the plurality of frames for navigation through the plurality of frames of the content item to the target frame;
receiving a third input along at least one of the horizontal axis or the vertical axis of the touchscreen display; and
in response to receiving the third input:
causing, using the touchscreen display, the navigation process to present one or more frames of the plurality of frames for resuming playback of the content item or selection, wherein a respective time point of the one or more frames presented is according to the updated setting along the scale of the slider control and a direction of content navigation according to the third input; and
providing for display a frame of the one or more frames according to the third input and based on the updated setting along the scale of the slider control.

2. The method of claim 1, wherein:
when the modification of the slider control to the updated setting to a relatively lower setting, as compared to the original setting, translates to a smaller shift in a play position of the content item responsive to the third input; and
when the modification of the slider control to the updated setting to a relatively higher setting, as compared to the original setting, translates to a larger shift in the play position of the content item responsive to the third input.

3. The method of claim 1, wherein:
a direction of content navigation in a first reverse position, as indicated by the third input, translates to a reverse direction of playback relative to the currently presented frame responsive to the third input;
the direction of content navigation in a second off position, as indicated by the third input, translates to no designation of a direction of playback relative to the currently presented frame responsive to the third input; and
the direction of content navigation in a third forward position, as indicated by the third input, translates to a forward direction of playback relative to the currently presented frame responsive to the third input.

4. The method of claim 3, wherein, in response to the direction of content navigation in the second off position as indicated by the third input, no designation of a direction of playback of the content item responsive to the third input is made, and wherein the direction of playback is based on an initial direction of the third input.

5. The method of claim 1, further comprising:
in response to the third input including a clockwise direction path, the content item is navigated in a forward direction; and
in response to the third input including a counterclockwise direction path, the content item is navigated in a reverse direction.

6. The method of claim 5, further comprising:
in response to the third input including the clockwise direction path and exceeding at least a minimum range of rotation, the content item is navigated in the forward direction through the plurality of frames; and
in response to the third input including the counterclockwise direction path and exceeding at least a minimum range of rotation, the content item is navigated in the reverse direction through the plurality of frames.

7. The method of claim 6, wherein the minimum range of rotation is 360 degrees.

8. The method of claim 1, wherein:
the frame of the one or more frames is continually updated as the third input changes;
a two-dimensional grid of the touchscreen display is at least partially defined by at least one of the horizontal axis or the vertical axis of the touchscreen display;
the second input and the third input occur along a two-dimensional path within the two-dimensional grid of the touchscreen display and without a break in contact with the touchscreen display along at least one of the horizontal axis or the vertical axis; and
content navigation through the plurality of frames is based on the two-dimensional path whose length is translated to a shift in play position from the currently presented frame to the target frame based at least in part on the updated setting along the scale set by the second input.

9. The method of claim 1, further comprising:
generating, at the touchscreen display, a toggle control for setting a direction of content navigation through the plurality of frames; and
receiving, at the touchscreen display, a separate input to the toggle control, wherein the separate input causes setting of the direction of content navigation through the plurality of frames.

10. The method of claim 9, wherein the toggle control includes a forward position for setting a forward direction of content navigation, and a reverse position for setting a reverse direction of content navigation.

11. A system comprising:
a touchscreen display for receiving inputs for navigation through a plurality of frames of a content item; and
control circuitry communicatively coupled to the touchscreen display, wherein the control circuitry is configured to:
receive a first input that causes activation of a navigation process during playback of the content item, wherein the navigation process enables modification of a currently presented frame of a plurality of frames of the content item to a target frame of the plurality of frames;
access a predetermined resolution of the touchscreen display, wherein the predetermined resolution defines a number of pixels along at least one of a horizontal axis of the touchscreen display or a vertical axis of the touchscreen display;
generate, on the touchscreen display, a slider control for setting a scale of content navigation based at least in part on the predetermined resolution of the touchscreen display in response to receiving the first input, wherein modification of the slider control based on a second input correlates a number of pixels alone at least one of the horizontal axis or the vertical axis of the touchscreen display to a number of frames of the plurality of frames;
receive, at the touchscreen display, the second input that causes modification of the slider control to an updated setting along a scale of the slider control that is different from an original setting along the scale, wherein the updated setting modifies a correlated relationship between the number of pixels alone at least one of the horizontal axis or the vertical axis of the touchscreen display to the number of frames of the plurality of frames for navigation through the plurality of frames of the content item to the target frame;
receive a third input along at least one of the horizontal axis or the vertical axis of the touchscreen display; and
in response to the third input:
cause, using the touchscreen display, the navigation process to present one or more frames of the plurality of frames for resuming playback of the content item or selection, wherein a respective time point of the one or more frames presented is according to the updated setting along the scale of the slider control and a direction of content navigation according to the third input; and
provide for display a frame of the one or more frames according to the third input and based on the updated setting along the scale of the slider control.

12. The system of claim 11, wherein:
when the modification of the slider control to the updated setting to a relatively lower setting, as compared to the original setting, translates to a smaller shift in a play position of the content responsive to the third input; and
when the modification of the slider control to the updated setting to a relatively higher setting, as compared to the original setting, translates to a larger shift in the play position of the content item responsive to the third input.

13. The system of claim 11, wherein:
a direction of content navigation in a first reverse position, as indicated by the third input, translates to a reverse direction of playback relative to the currently presented frame responsive to the third input;
the direction of content navigation in a second off position, as indicated by the third input, translates to no designation of a direction of playback of the content relative to the currently presented frame responsive to the third input; and
the direction of content navigation in a third forward position, as indicated by the third input, translates to a forward direction of playback relative to the current presented frame responsive to the third input.

14. The system of claim 13, wherein, in response to the direction of content navigation in the second off position as indicated by the third input, no designation of a direction of playback of the content item responsive to the third input is made, and wherein the direction of playback is based on an initial direction of the third input.

15. The system of claim 11, further comprising:
in response to the third input including a clockwise direction path, the content item is navigated in a forward direction; and in response to the third input including a counterclockwise direction path, the content item is navigated in a reverse direction.

16. The system of claim 15, wherein the control circuitry is further configured to:
in response to the third input including the clockwise direction path and exceeding at least a minimum range of rotation, wherein the minimum range of rotation is 360 degrees, the content item is navigated in the forward direction through the plurality of frames; and
in response to the third input including the counterclockwise direction path and exceeding at least a minimum range of rotation, the content item is navigated in the reverse direction through the plurality of frames.

17. The system of claim 11, wherein
the frame of the one or more frames is continually updated as the third input changes;
a two-dimensional grid of the touchscreen display is at least partially defined by at least one of the horizontal axis or the vertical axis of the touchscreen display;
the second input and the third input occur along a two-dimensional path within the two-dimensional grid of the touchscreen display and without a break in contact with the touchscreen display along at least one of the horizontal axis or the vertical axis; and
content navigation through the plurality of frames is based on the two-dimensional path whose length is translated to a shift in play position from the currently presented frame to the target frame based at least in part on the updated setting along the scale set by the second input.

18. The system of claim 11, wherein
the control circuitry is configured to generate, at the touchscreen display, a toggle control for setting a direction of content navigation through the plurality of frames, and
the control circuitry configured to receive, at the touchscreen display, a separate input to the toggle control, wherein the separate input causes setting of the direction of content navigation through the plurality of frames.

19. The system of claim 18, wherein the toggle control includes a forward position for setting a forward direction of content navigation, and a reverse position for setting a reverse direction of content navigation.

20. A method comprising:
receiving a first input via a touchscreen display of a computing device comprising processing circuitry configured to execute computer readable instructions;
accessing a predetermined resolution of the touchscreen display, wherein the predetermined resolution defines a pixel count;
causing the processing circuitry to generate for display a slider control on the touchscreen display, wherein the slider control sets a scale of content navigation based on the predetermined resolution and correlates the pixel count to a frame count;
receiving a second input via the touchscreen display;
modifying the slider control to an updated setting, wherein the updated setting alters the correlation between the pixel count and the frame count;
receiving a third input via the touchscreen display;
setting a direction of presentation of the content item; and
causing the processing circuitry to generate for display one or more frames for resuming playback and selection using the touchscreen display, wherein a time point of the displayed one or more frames is determined by the updated setting and the direction.

* * * * *